Sept. 15, 1925.  J. E. COOK  1,553,989
WAFFLE IRON
Filed June 17, 1922
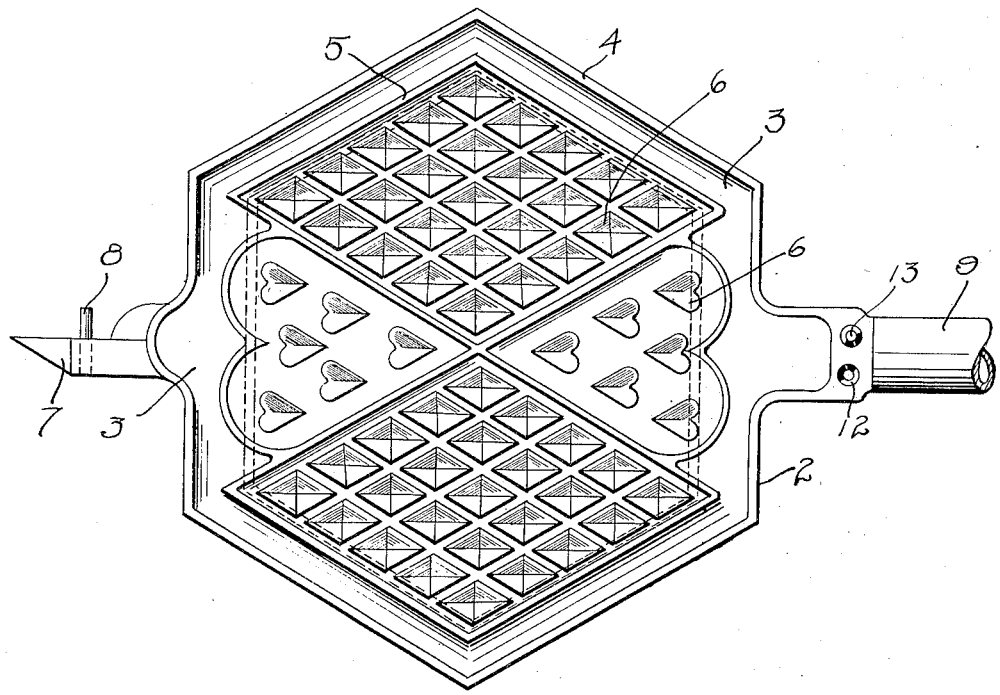
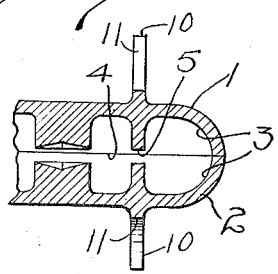
INVENTOR
J. E. Cook
BY
ATTORNEYS Patented Sept. 15, 1925.

1,553,989

UNITED STATES PATENT OFFICE.

JAY E. COOK, OF MEADVILLE, PENNSYLVANIA, ASSIGNOR TO INEZ K. GAYLORD, OF OKLAHOMA COUNTY, OKLAHOMA.

WAFFLE IRON.

Application filed June 17, 1922. Serial No. 569,116.

*To all whom it may concern:*

Be it known that I, JAY E. COOK, a citizen of the United States, and a resident of Meadville, in the county of Crawford and State of Pennsylvania, have invented a new and useful Improvement in Waffle Irons, of which the following is a full, clear, and exact description.

My invention relates to improvements in waffle irons, and it consists in the combinations, constructions and arrangements herein described and claimed.

An object of my invention is to provide a waffle iron, in which the two sections are each provided with a heat retaining recess, thereby obviating the necessity of providing a heat retaining auxiliary frame, as is the case in the ordinary waffle iron.

A further object of my invention is to provide a device of the character described, which has novel means by which the waffle iron may be turned.

A further object of my invention is to provide a device of the character described, which has a trough for receiving the dough overflow.

A further object of my invention is to provide a device of the character described, in which the two sections are identical with respect to each other, thereby reducing the manufacturing cost.

A further object of my invention is to provide a device of the character described, which is extremely light, so that it can be readily lifted by any one.

A further object of my invention is to provide a device of the character described, which is simple in construction, and which is not likely to easily get out of order.

Other objects and advantages will appear in the following specification, and the novel features of the invention will be particularly pointed out in the appended claim.

My invention is illustrated in the accompanying drawings, forming a part of the application, in which Figure 1 is a side elevation of the device, Figure 2 is a plan view of one of the sections of the device, and Figure 3 is a section along the line 3—3 of Figure 1.

In carrying out my invention, I provide two sections 1 and 2 which are identical with respect to each other. A description of one of the halves or sections will therefore suffice for the description of both sections.

In Figure 2, I have shown the inside plan view of one of the sections. In the present instance, I have shown the section as being in the shape of a hexagon, although any other shape of the iron would be just as efficient. I therefore do not wish to be confined to the specific shape of the iron as illustrated in the drawing. The section has a dough receiving trough 3 which is adapted to receive the overflow dough from the sections. The trough 3 is formed by the outer upwardly extending edge 4 and the inner upwardly extending flange 5. In Figure 3, I have shown a portion of the two sections in closed position. It will be noted that the sections 1 and 2 abut each other only along the edges 4, and that the flanges 5 are spaced from each other, thus permitting any excess dough to flow into the trough 3.

The portion of the section surrounded by the flange 5 is provided with projections 6 of any desired shape. These projections make the dough relatively thin, and also act as additional heating surfaces for the waffle. The projections 6 gives the waffle its characteristic appearance. The flange 5 is fashioned into a novel shape, and in the present instance it divides the waffle into two rectangular sections, having rectangular projections therein, and into two heart-shaped sections, having heart-shaped projections therein.

Each of the sections 1 and 2 has a point shaped projection 7, which is adapted to be hinged to the projection 7 of the other section by means of a pin 8. The sections also carry insulated handles 9. The points 7, when in closed position, form a tapered end to the iron, whereby the device may be readily turned from side to side.

A flange 10 projects outwardly from the outer surface of the section or half, and provides a heat retaining recess. The flange 10 has cut away portions, to permit a slight circulation of the heat in the recess. It is obvious that if the flange 10 were not provided with the cut away portions 11, the recess enclosed by the flange would form a dead air space, which would prevent the iron from being effectually heated.

From the foregoing description of the various parts of the device, the operation thereof may be readily understood. When using the iron, the sections 1 and 2 are swung apart and the batter is poured upon the lowermost section. The two sections are then closed. The iron may be placed upon any heated surface or upon the grid of the ordinary gas range. The batter in cooking "rises" and, in the ordinary waffle iron, overflows and runs down the side of the iron. With the present device, however, the batter flows into the trough 3, and is retained therein. The iron is heated just as effectively as is the ordinary iron which is provided with a heat retaining and supporting casing, since the flange 10 forms a pocket for the heat. Furthermore, the device is lighter than the ordinary iron, because the flange 10 is relatively narrow and is an integral part of the section.

When the batter in the iron has been cooked long enough on one side, the iron is manually swung upwardly, the iron swinging on the points 7 as a pivot. As soon as the iron has been swung upwardly to a sufficient height, it may be rotated about the points 7, until the side of the iron which was formerly on top is disposed adjacent to the heated surface. The iron may then be lowered in position. The points 7 provide an easy means by which the iron may be turned, without the necessity of removing the device from the supporting surface.

The handles 9 are preferably made from some insulating material, such as hard rubber or the like. The device is extremely light and readily portable. Each section has a recess 12 and a pin 13 adjacent to the handle 9, whereby the two sections are automatically alined with each other when swung into closed position. The device consists of a minimum number of parts and is durable and efficient for the purpose intended.

While I have shown a waffle iron which is primarily adapted for use with a stove, such as a gas stove, a coal stove, or other fuel burning stove, it is obvious that the iron might be of the electric type. Thus, an electric waffle iron, provided with a groove or trough for receiving any overflow of dough or batter, would fall within the purview of this invention.

I claim:

A waffle iron comprising two sections pivotally secured to each other, a groove disposed about the edge of each section, said groove having a relatively high outer edge and a relatively narrow inner edge, whereby the inner edges will be spaced from each other when said sections are swung into closed position.

JAY E. COOK.